United States Patent
Barbieri et al.

(10) Patent No.: US 9,584,285 B2
(45) Date of Patent: *Feb. 28, 2017

(54) MULTI-POINT PUCCH ATTACHMENT

(71) Applicant: QUALCOMM INCORPORATED, San Diego, CA (US)

(72) Inventors: Alan Barbieri, San Diego, CA (US); Tingfang Ji, San Diego, CA (US); Hao Xu, San Diego, CA (US); Wanshi Chen, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/568,065

(22) Filed: Dec. 11, 2014

(65) Prior Publication Data
US 2015/0098427 A1 Apr. 9, 2015

Related U.S. Application Data

(63) Continuation of application No. 13/592,194, filed on Aug. 22, 2012, now Pat. No. 8,948,090.
(Continued)

(51) Int. Cl.
H04W 72/00 (2009.01)
H04L 5/00 (2006.01)
(Continued)

(52) U.S. Cl.
CPC .......... H04L 5/0053 (2013.01); H04L 5/0035 (2013.01); H04L 5/0073 (2013.01);
(Continued)

(58) Field of Classification Search
CPC ... H04L 5/0035; H04L 5/0053; H04L 5/0073; H04W 24/10; H04W 72/0413; H04W 72/082; H04W 88/02; H04W 88/08
(Continued)

(56) References Cited

U.S. PATENT DOCUMENTS 8,447,236 B2 5/2013 Gorokhov et al.
8,542,655 B2 * 9/2013 Kuroda ................. H04L 1/0026 370/332
(Continued)

FOREIGN PATENT DOCUMENTS

JP 2012235352 A 11/2012
JP 5684237 B2 3/2015
(Continued)

OTHER PUBLICATIONS

Fujitsu., "Macro UE initiated eICIC through CSG femto eNB," 3GPP TSG-RAN1 #62, R1-104883, Aug. 23-27, 2010, 3 Pages.
(Continued)

Primary Examiner — Mohamed Kamara
(74) Attorney, Agent, or Firm — Seyfarth Shaw LLP

(57) ABSTRACT

Periodic over-the-air channel state information (CSI) reporting to serving cells and one or more non-serving cells via a control channel multi-point attachment is disclosed. The channel state information report may be transmitted based on information indicating how to transmit the channel state information report to the non-serving cell. The information indicating how to transmit the channel state information report may be provided by the serving eNodeB. The information may include a periodicity, offset parameters, timing advance commands, power control commands, and/or an aperiodic report request.

27 Claims, 16 Drawing Sheets

Related U.S. Application Data

(60) Provisional application No. 61/527,551, filed on Aug. 25, 2011.

(51) Int. Cl.
*H04W 72/08* (2009.01)
*H04W 72/04* (2009.01)
*H04W 24/10* (2009.01)
*H04W 88/02* (2009.01)
*H04W 88/08* (2009.01)

(52) U.S. Cl.
CPC ..... *H04W 72/0413* (2013.01); *H04W 72/082* (2013.01); *H04W 24/10* (2013.01); *H04W 88/02* (2013.01); *H04W 88/08* (2013.01)

(58) Field of Classification Search
USPC ....... 370/203, 208, 281–282, 295, 310, 315, 370/324, 350, 395.62, 328–329, 332, 370/338–339, 341, 349; 455/67.3, 455/443–444, 446, 448–450, 464, 502, 455/524–525
See application file for complete search history.

(56) References Cited

U.S. PATENT DOCUMENTS

| | | | |
|---|---|---|---|
| 2004/0022213 A1* | 2/2004 | Choi | H04W 24/10 370/332 |
| 2006/0268783 A1 | 11/2006 | Julian et al. | |
| 2007/0287462 A1 | 12/2007 | Gorokhov et al. | |
| 2009/0075596 A1 | 3/2009 | Gorokhov et al. | |
| 2009/0197590 A1 | 8/2009 | Borran et al. | |
| 2009/0257390 A1 | 10/2009 | Ji et al. | |
| 2010/0009634 A1 | 1/2010 | Budianu et al. | |
| 2010/0056061 A1 | 3/2010 | Luo et al. | |
| 2010/0273499 A1* | 10/2010 | van Rensburg | H04W 72/1231 455/450 |
| 2010/0322176 A1* | 12/2010 | Chen | H04B 7/024 370/329 |
| 2010/0322351 A1* | 12/2010 | Tang | H04B 7/024 375/316 |
| 2011/0013710 A1 | 1/2011 | Xiao | |
| 2011/0105135 A1 | 5/2011 | Krishnamurthy et al. | |
| 2011/0217985 A1 | 9/2011 | Gorokhov | |
| 2011/0274043 A1 | 11/2011 | Nam et al. | |
| 2012/0051257 A1 | 3/2012 | Kim et al. | |
| 2012/0063321 A1 | 3/2012 | Chandrasekhar et al. | |
| 2012/0120846 A1 | 5/2012 | Hwang et al. | |
| 2012/0127869 A1 | 5/2012 | Yin et al. | |
| 2012/0230268 A1 | 9/2012 | Marinier et al. | |
| 2012/0252460 A1 | 10/2012 | Koskinen et al. | |
| 2013/0051322 A1 | 2/2013 | Barbieri et al. | |

FOREIGN PATENT DOCUMENTS

| | | |
|---|---|---|
| WO | 2009140637 A2 | 11/2009 |
| WO | 2011038410 A1 | 3/2011 |
| WO | 2011126025 A1 | 10/2011 |

OTHER PUBLICATIONS

Damnjanovic A., et al., "UE's Role in LTE Advanced Heterogeneous Networks," IEEE Communications Magazine, LTE-Advanced and 4G Wireless Communications, Feb. 2012, pp. 164-176.
International Search Report and Written Opinion—PCT/US2012/052104—ISA/EPO—Nov. 20, 2012.
Motorola: "RACH aided initiation of eICIC", 3GPP Draft; R1-105717, 3rd Generation Partnership Project (3GPP), Mobile Competence Centre; 650, Route Deslucioles; F-06921 Sophia-Antipolis Cedex; France, vol. RAN WG1, No. Xia an, China; 201010, Oct. 14, 2010 (Oct. 14, 2010), XP050489341, [retrieved on Oct. 14, 2010].

* cited by examiner

MULTI-POINT PUCCH ATTACHMENT

CROSS REFERENCE TO RELATED APPLICATIONS

This application is a continuation of U.S. patent application Ser. No. 13/592,194, entitled "MULTI-POINT PUCCH ATTACHMENT," filed on Aug. 22, 2012, which claims the benefit under 35 U.S.C. §119(e) to U.S. Provisional Patent Application No. 61/527,551, entitled "MULTI-POINT PUCCH ATTACHMENT," filed on Aug. 25, 2011, the disclosures of which are expressly incorporated herein by reference in their entireties.

BACKGROUND

Field

Aspects of the present disclosure relate generally to wireless communication systems, and more particularly to transmitting multi-point attachments via a PUCCH.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

SUMMARY

Various aspects of the present disclosure are directed to periodic over-the-air channel state information (CSI) reporting to serving cells and one or more non-serving cells via a control channel multi-point attachment. The channel state information report may be transmitted based on information indicating how to transmit the channel state information report to the non-serving cell. The information indicating how to transmit the channel state information report may be provided by the serving eNodeB. Furthermore, the information may include a periodicity, offset parameters, timing advance commands, power control commands, and/or an aperiodic report request.

Other aspects of the present disclosure are directed to negotiating reporting parameters for channel state information reports to be transmitted by a non-served user equipment (UE) and receiving the channel state information reports over air from the non-served UE. The reporting parameters may be communicated to the non-served UE via a serving cell of the non-served UE. Furthermore, the reporting parameters may include power control commands, timing advance commands, and/or aperiodic report requests.

In accordance with an aspect of the present disclosure, a method of wireless communication is presented. The method includes identifying an aggressor eNodeB that is interfering with a downlink signal from a serving eNodeB. The method also includes transmitting a channel state information report to the aggressor eNodeB.

In accordance with another aspect, a method of wireless communication is presented. The method includes determining reporting parameters for channel state information reports to be transmitted by a non-served UE. The method also includes receiving channel state information reports over air from the non-served UE.

In accordance with yet another aspect, an apparatus for wireless communications is presented. The apparatus includes means for identifying an aggressor eNodeB that is interfering with a downlink signal from a serving eNodeB. The apparatus also includes means for transmitting a channel state information report to the aggressor eNodeB.

In accordance with still yet another aspect, an apparatus for wireless communications is presented. The apparatus includes means for determining reporting parameters for channel state information reports to be transmitted by a non-served UE. The apparatus also includes means for receiving channel state information reports over air from the non-served UE.

In accordance with an aspect, a computer program product for wireless communications is presented. The computer program product includes a non-transitory computer-readable medium having program code recorded thereon, which, when executed by the processor(s) causes the processor(s) to perform operations of identifying an aggressor eNodeB that is interfering with a downlink signal from a serving eNodeB. The program code also causes the processor(s) to transmit a channel state information report to the aggressor eNodeB.

In accordance with yet another aspect, a computer program product for wireless communications is presented. The computer program product includes a non-transitory computer-readable medium having program code recorded thereon, which, when executed by the processor(s), causes the processor(s) to perform operations of determining reporting parameters for channel state information reports to be transmitted by a non-served UE. The program code also causes the processor(s) to receive CSI reports over air from the non-served UE.

In accordance with still yet another aspect, an apparatus for wireless communications is presented. The apparatus includes a memory and at least one processor coupled to the memory. The processor(s) is configured to identify an aggressor eNodeB that is interfering with a downlink signal from a serving eNodeB. The processor(s) is also configured to transmit a channel state information report to the aggressor eNodeB.

In accordance with still yet another aspect, an apparatus for wireless communications is presented. The apparatus includes a memory and at least one processor coupled to the memory. The processor(s) is configured to determine reporting parameters for channel state information reports to be transmitted by a non-served UE. The processor(s) is also configured to receive CSI reports over air from the non-served UE.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
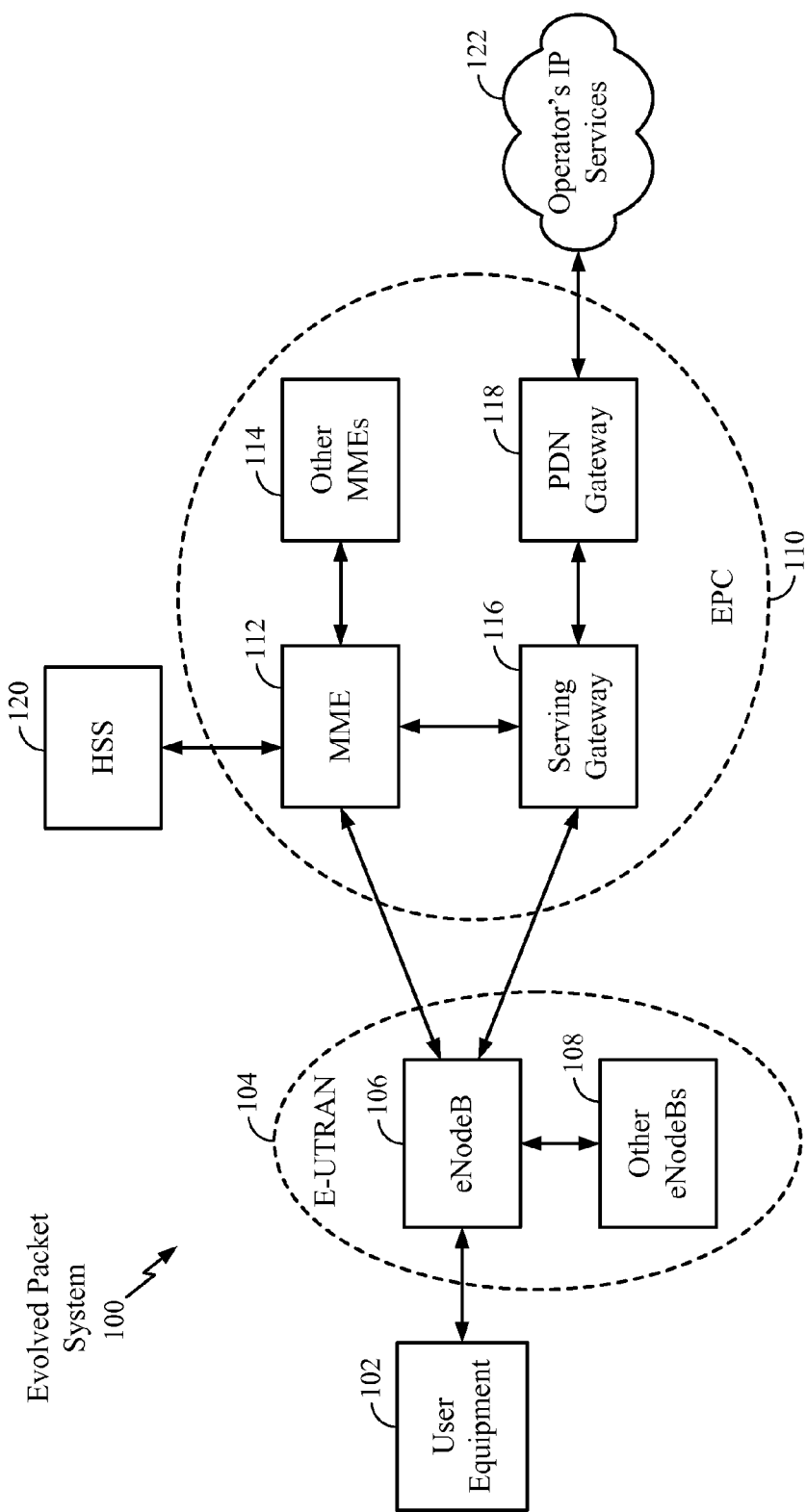
FIG. 1 is a diagram illustrating an example of a network architecture.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Aspects of the telecommunication systems are presented with reference to various apparatus and methods. These apparatus and methods are described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNodeB) 106 and other eNodeBs 108. The eNodeB 106 provides user and control plane protocol terminations toward the UE 102. The eNodeB 106 may be connected to the other eNodeBs 108 via a backhaul (e.g., an X2 interface). The eNodeB 106 may also be referred to as a base station, a base transceiver station, a radio base station, a radio transceiver, a transceiver function, a basic service set (BSS), an extended service set (ESS), or some other suitable terminology. The eNodeB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNodeB 106 is connected to the EPC 110 via, e.g., an S1 interface. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
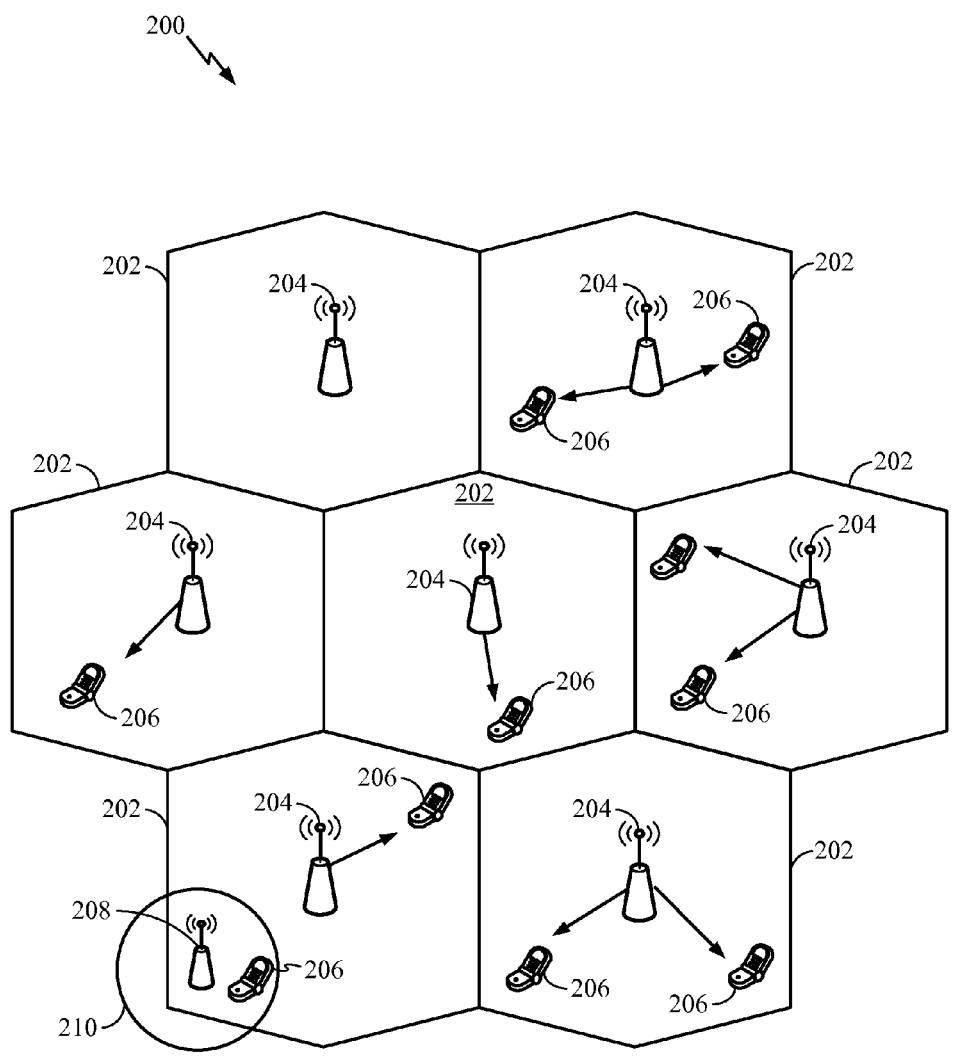
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNodeBs 208 may have cellular regions 210 that overlap with one or more of the cells 202. The lower power class eNodeB 208 may be a remote radio head (RRH), a femto cell (e.g., home eNodeB (HeNodeB)), pico cell, or micro cell. The macro eNodeBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNodeBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the downlink and SC-FDMA is used on the uplink to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNodeBs 204 may have multiple antennas supporting MIMO technology. The use of MIMO technology enables the eNodeBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the downlink. The spatially precoded data streams arrive at the UE(s) 206 with different spatial signatures, which enables each of the UE(s) 206 to recover the one or more data streams destined for that UE 206. On the uplink, each UE 206 transmits a spatially precoded data stream, which enables the eNodeB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the downlink. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The uplink may use SC-FDMA in the form of a DFT-spread OFDM signal to compensate for high peak-to-average power ratio (PAPR).

Figure 3:
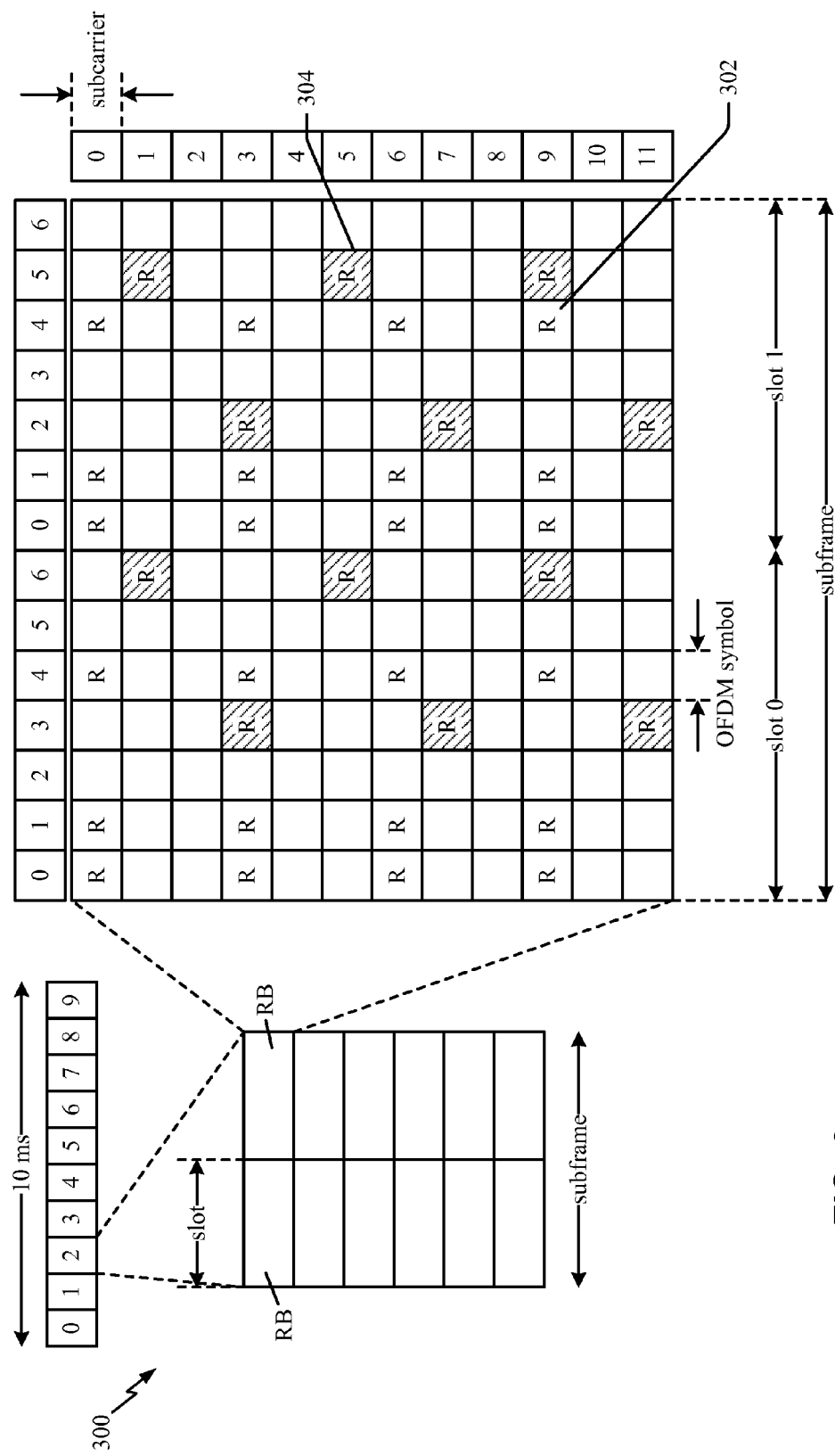
FIG. 3 is a diagram illustrating an example of a downlink frame structure in LTE.

FIG. 3 is a diagram 300 illustrating an example of a downlink frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, 304, include downlink reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical downlink shared channel (PDSCH) is mapped. The number of bits carried by each resource element depends on the modulation scheme. Thus, the more resource blocks that a UE receives and the higher the modulation scheme, the higher the data rate for the UE.

Figure 4:
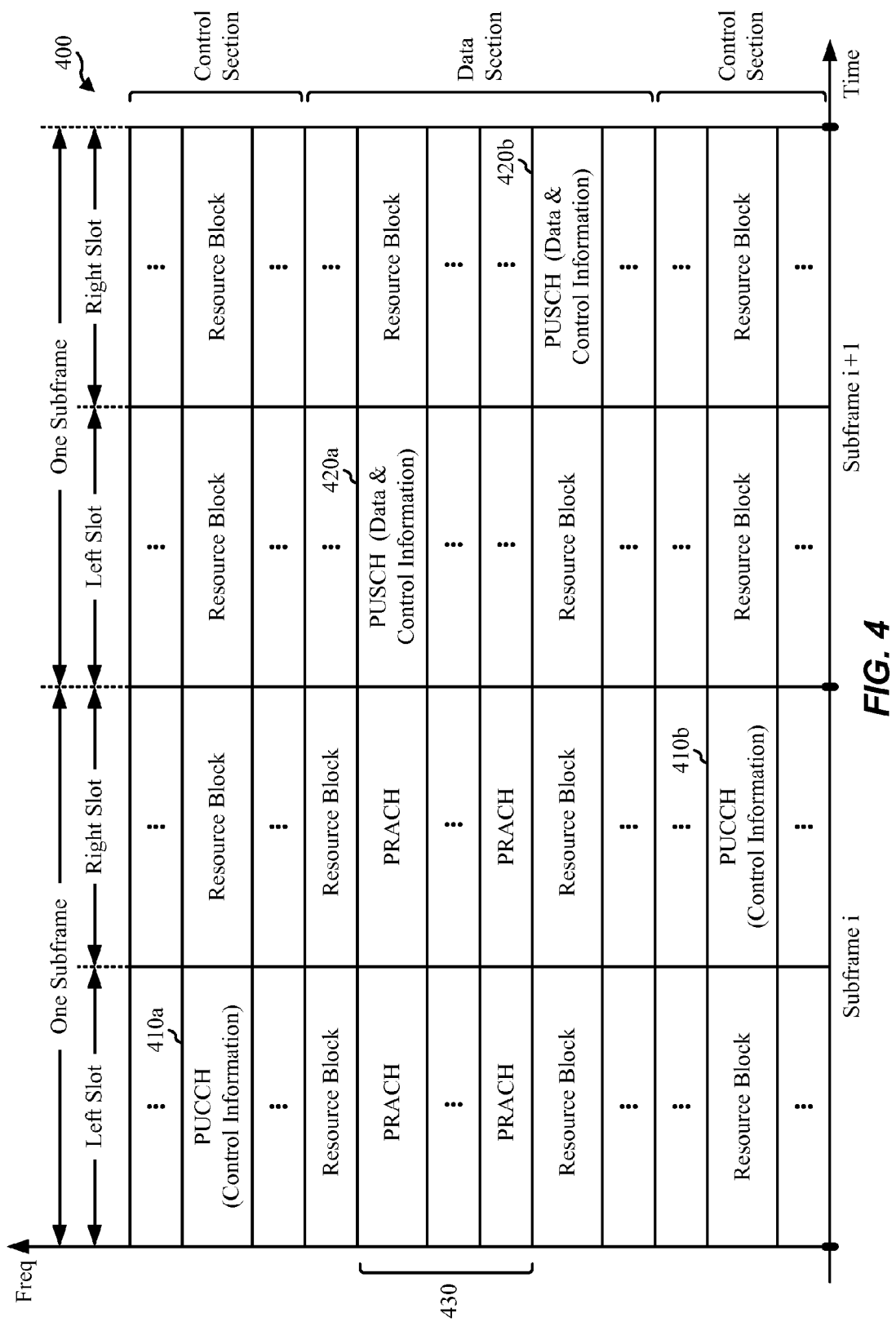
FIG. 4 is a diagram illustrating an example of an uplink frame structure in LTE.

FIG. 4 is a diagram 400 illustrating an example of an uplink frame structure in LTE. The available resource blocks for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The uplink frame structure results in the data section including contiguous subcarriers, which may allow a single UE to be assigned all of the contiguous subcarriers in the data section.

A UE may be assigned resource blocks 410a, 410b in the control section to transmit control information to an eNodeB. The UE may also be assigned resource blocks 420a, 420b in the data section to transmit data to the eNodeB. The UE may transmit control information in a physical uplink control channel (PUCCH) on the assigned resource blocks in the control section. The UE may transmit only data or both data and control information in a physical uplink shared channel (PUSCH) on the assigned resource blocks in the data section. An uplink transmission may span both slots of a subframe and may hop across frequency.

A set of resource blocks may be used to perform initial system access and achieve uplink synchronization in a physical random access channel (PRACH) 430. The PRACH 430 carries a random sequence and cannot carry any uplink data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
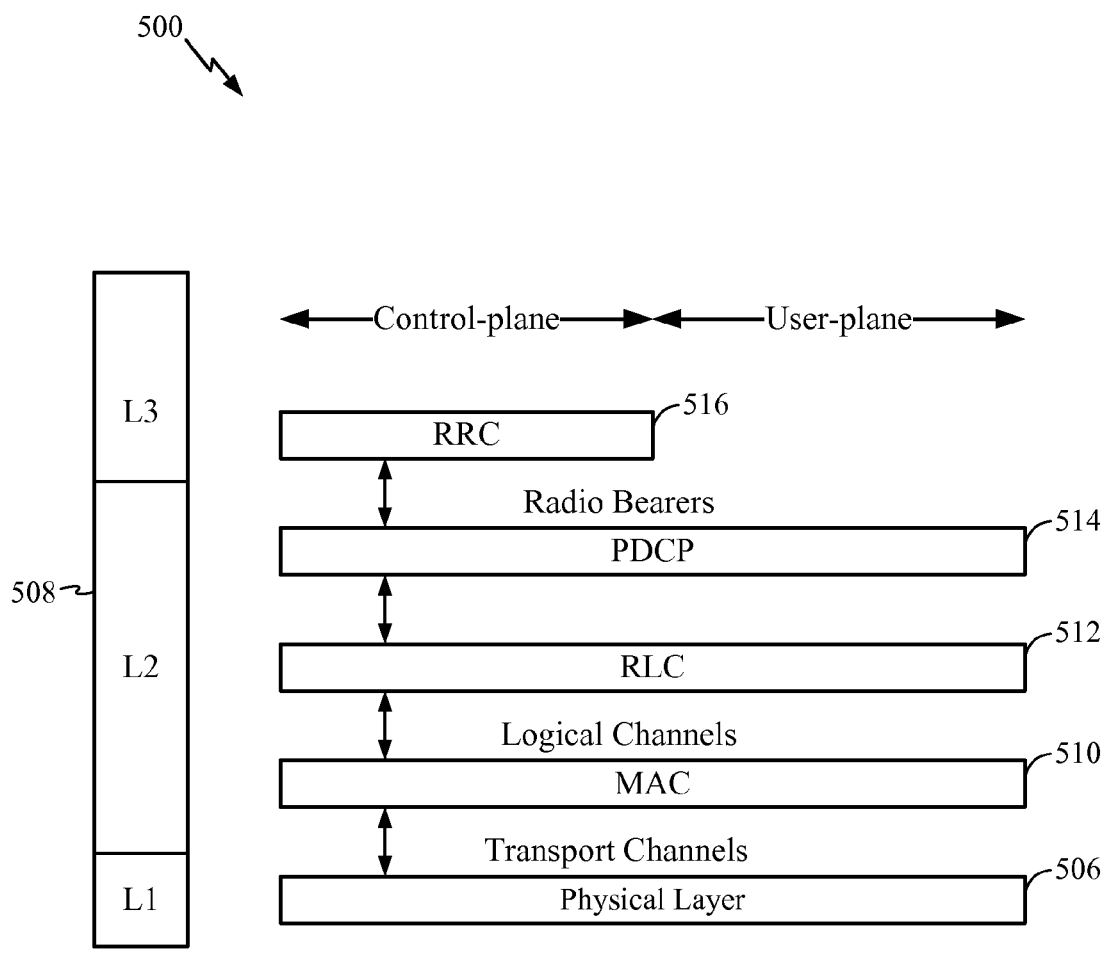
FIG. 5 is a diagram illustrating an example of a radio protocol architecture for the user and control plane.

FIG. 5 is a diagram 500 illustrating an example of a radio protocol architecture for the user and control planes in LTE. The radio protocol architecture for the UE and the eNodeB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNodeB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNodeB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNodeBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNodeB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNodeB and the UE.

Figure 6:
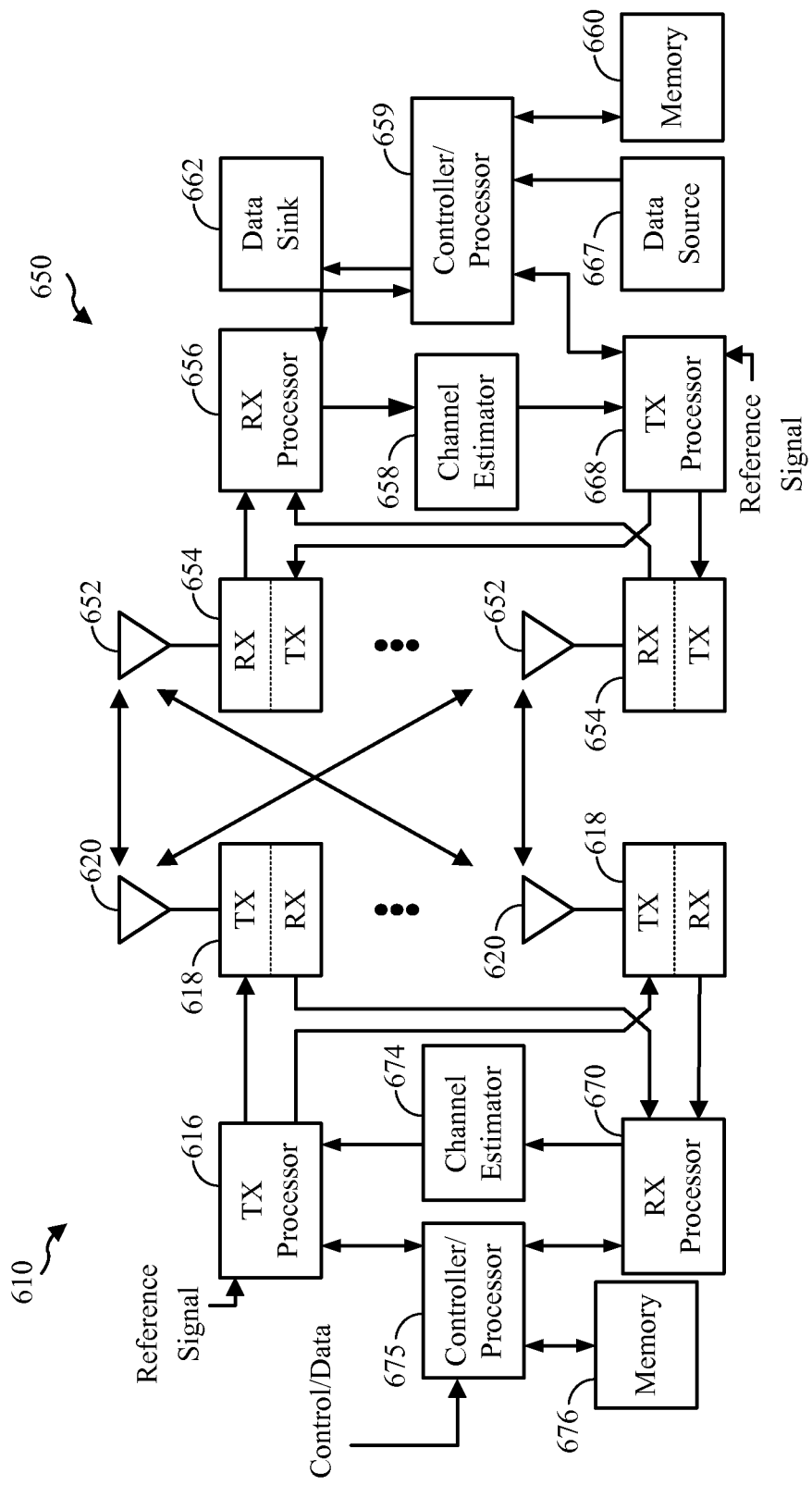
FIG. 6 is a diagram illustrating an example of an evolved Node B and user equipment in an access network.

FIG. 6 is a block diagram of an eNodeB 610 in communication with a UE 650 in an access network. In the downlink, upper layer packets from the core network are provided to a controller/processor 675. The controller/processor 675 implements the functionality of the L2 layer. In the downlink, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The TX processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receiver (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNodeB 610. These soft decisions may be based on channel estimates computed by the channel estimator 658. The soft decisions are then decoded and deinterleaved to recover the data and control signals that were originally transmitted by the eNodeB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the uplink, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the uplink, a data source 667 is used to provide upper layer packets to the controller/processor 659. The data source 667 represents all protocol layers above the L2 layer. Similar to the functionality described in connection with the downlink transmission by the eNodeB 610, the controller/processor 659 implements the L2 layer for the user plane and the control plane by providing header compression, ciphering, packet segmentation and reordering, and multiplexing between logical and transport channels based on radio resource allocations by the eNodeB 610. The controller/processor 659 is also responsible for HARQ operations, retransmission of lost packets, and signaling to the eNodeB 610.

Channel estimates derived by a channel estimator 658 from a reference signal or feedback transmitted by the eNodeB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The uplink transmission is processed at the eNodeB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the uplink, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
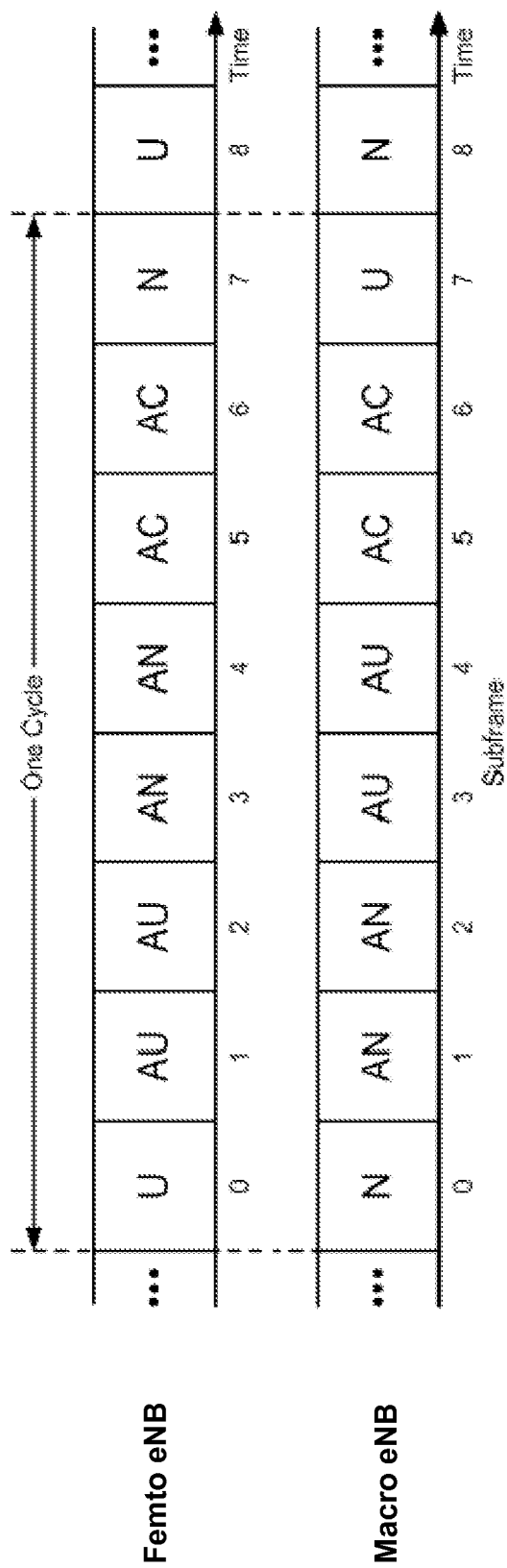
FIG. 7 is a block diagram conceptually illustrating adaptive resource partitioning in a heterogeneous network according to one aspect of the disclosure.

FIG. 7 is a block diagram illustrating TDM partitioning in a heterogeneous network according to one aspect of the disclosure. A first row of blocks illustrate subframe assignments for a femto eNodeB, and a second row of blocks illustrate subframe assignments for a macro eNodeB. Each of the eNodeBs has a static protected subframe during which the other eNodeB has a static prohibited subframe. For example, the femto eNodeB has a protected subframe (U subframe) in subframe 0 corresponding to a prohibited subframe (N subframe) in subframe 0. Likewise, the macro eNodeB has a protected subframe (U subframe) in subframe 7 corresponding to a prohibited subframe (N subframe) in subframe 7. Subframes 1-6 are dynamically assigned as either protected subframes (AU), prohibited subframes (AN), and common subframes (AC). The dynamically assigned subframes (AU/AN/AC) are referred to herein collectively as "X" subframes. During the dynamically assigned common subframes (AC) in subframes 5 and 6, both the femto eNodeB and the macro eNodeB may transmit data.

Protected subframes (such as U/AU subframes) have reduced interference and a high channel quality because aggressor eNodeBs are prohibited from transmitting. Prohibited subframes (such as N/AN subframes) have no data transmission to allow victim eNodeBs to transmit data with low interference levels. Common subframes (such as C/AC subframes) have a channel quality dependent on the number of neighbor eNodeBs transmitting data. For example, if neighbor eNodeBs are transmitting data on the common subframes, the channel quality of the common subframes may be lower than the protected subframes. Channel quality on common subframes may also be lower for cell range expansion area (CRE) UEs strongly affected by aggressor eNodeBs. An CRE UE may belong to a first eNodeB but also be located in the coverage area of a second eNodeB. For example, a UE communicating with a macro eNodeB that is near the range limit of a femto eNodeB coverage is an CRE UE.

Another example interference management scheme that may be employed in LTE/-A is the slowly-adaptive interference management. Using this approach to interference management, resources are negotiated and allocated over time scales that are much larger than the scheduling intervals. The goal of the scheme is to find a combination of transmit powers for all of the transmitting eNodeBs and UEs over all of the time or frequency resources that maximizes the total utility of the network. "Utility" may be defined as a function of user data rates, delays of quality of service (QoS) flows, and fairness metrics. Such an algorithm can be computed by a central entity that has access to all of the information used for solving the optimization and has control over all of the transmitting entities, such as, for example, a network controller. This central entity may not always be practical or even desirable. Therefore, in alternative aspects a distributed algorithm may be used that makes resource usage decisions based on the channel information from a certain set of nodes. Thus, the slowly-adaptive interference algorithm may be deployed either using a central entity or by distributing the algorithm over various sets of nodes/entities in the network.

In deployments of heterogeneous networks, such as the wireless network 100, a UE may operate in a dominant interference scenario in which the UE may observe high interference from one or more interfering eNodeBs. A dominant interference scenario may occur due to restricted association. For example, in FIG. 1, the UE 120y may be close to the femto eNodeB 110y and may have high received power for the eNodeB 110y. However, the UE 120y may not be able to access the femto eNodeB 110y due to restricted association and may then connect to the macro eNodeB 110c (as shown in FIG. 1) or to the femto eNodeB 110z also with lower received power (not shown in FIG. 1). The UE 120y may then observe high interference from the femto eNodeB 110y on the downlink and may also cause high interference to the eNodeB 110y on the uplink. Using coordinated interference management, the eNodeB 110c and the femto eNodeB 110y may communicate over the backhaul to negotiate resources. In the negotiation, the femto eNodeB 110y agrees to cease transmission on one of its channel resources, such that the UE 120y will not experience as much interference from the femto eNodeB 110y as it communicates with the eNodeB 110c over that same channel.

In addition to the discrepancies in signal power observed at the UEs in such a dominant interference scenario, timing delays of downlink signals may also be observed by the UEs, even in synchronous systems, because of the differing distances between the UEs and the multiple eNodeBs. The eNodeBs in a synchronous system are presumptively synchronized across the system. However, for example, considering a UE that is a distance of 5 km from the macro eNodeB, the propagation delay of any downlink signals received from that macro eNodeB would be delayed approximately 16.67 μs (5 km÷3×108, i.e., the speed of light, 'c'). Comparing that downlink signal from the macro eNodeB to the downlink signal from a much closer femto eNodeB, the timing difference could approach the level of a time tracking loop (TTL) error.

Additionally, such timing difference may impact the interference cancellation at the UE. Interference cancellation often uses cross correlation properties between a combination of multiple versions of the same signal. By combining multiple copies of the same signal, interference may be more easily identified because, while there will likely be interference on each copy of the signal, it will likely not be in the same location. Using the cross correlation of the combined signals, the actual signal portion may be determined and distinguished from the interference, thus, allowing the interference to be canceled.

The LTE network may also include a coordinated multi point (CoMP) transmission feature. CoMP provides an interference mitigation technique for improving overall communication performance. Specifically, multiple eNodeBs, also known as base stations, collaborate with each other, so that the eNodeBs may simultaneously transmit the same information in parallel to one or more UEs. The simultaneous transmission improves overall communication performance.

Figure 8:
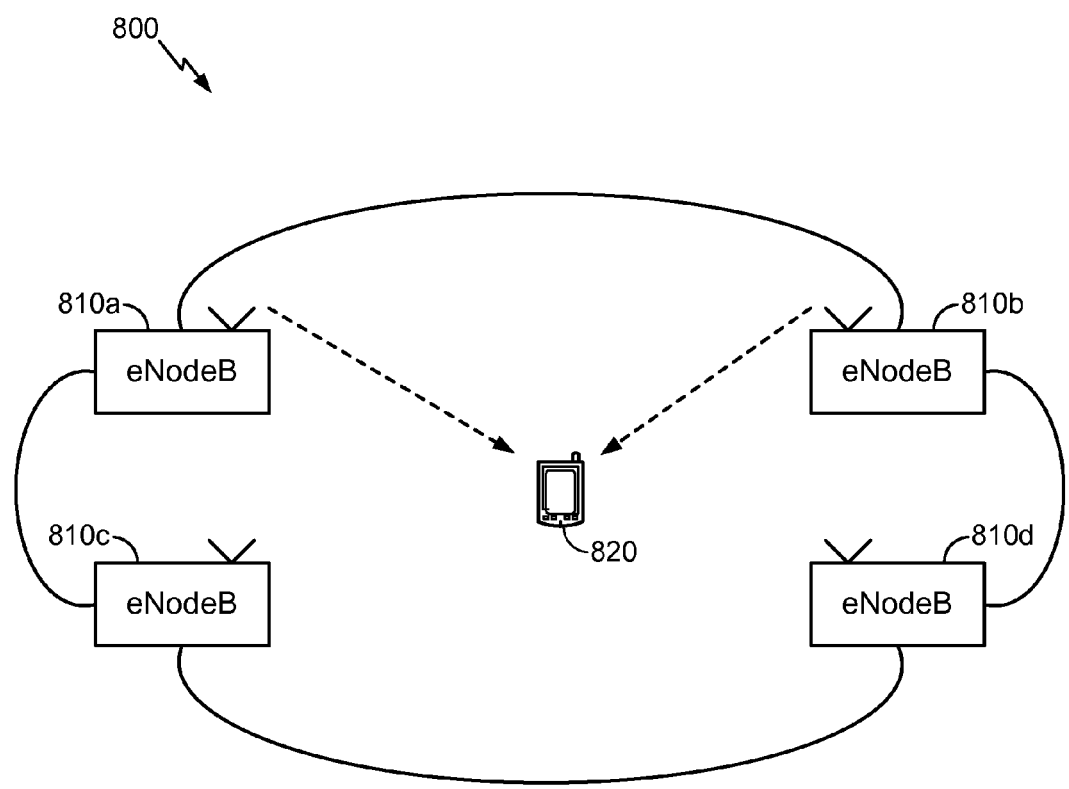
FIG. 8 is a block diagram conceptually illustrating coordinated multi point (CoMP) network.

FIG. 8 illustrates an example coordinated multi point (CoMP) network 800 with multiple eNodeBs 810a, 810b, 810c, 810d transmitting to a user equipment 820. The multiple eNodeBs 810a, 810b, 810c, 810d may communicate with each other. That is, each eNodeB may communicate with any of the other eNodeBs. For example a specific eNodeB, such as eNodeB 810a, may communicate with other eNodeBs, such as eNodeBs 810b, 810c, and/or 810d.

In one example, CoMP transmission may be used to improve the received signal-to-interference plus noise ratio (SINR). Accordingly, the improved SINR may also improve the data rate, through enhanced spatial multiplexing or interference reduction through coordinated action by multiple eNodeBs. Such coordination typically specifies increased synchronization and message exchanges among the coordinating eNodeBs.

Feedback techniques for the support of downlink CoMP may be characterized as either explicit feedback, implicit feedback, and/or UE transmission of sounding reference signals (SRS). For explicit feedback, information observed by the receiver is sent back to the transmitter without assuming any transmitter or receiver processing. For implicit feedback, information is sent back to the transmitter that uses a hypotheses of different transmission and/or reception processing (e.g., channel quality indication (CQI), precoder matrix indication (PMI), and rank indication (RI)). User equipment transmissions of sounding reference signals may be used for channel state information (CSI) estimation at an eNodeB exploiting channel reciprocity.

The CoMP transmission may be characterized as coordinated scheduling/beamforming (CS/CB), dynamic cell selection (DCS), and joint transmission (JT). In coordinated scheduling/beamforming, data is only available at the serving cell but user scheduling/beamforming decisions are made with coordination among cells corresponding to the CoMP cooperating set (CCS). Dynamic cell selection and joint transmission are types of joint processing. In dynamic cell selection (DCS), the PDSCH is transmitted from one point at a time within a CoMP cooperating set. In joint transmission, the PDSCH is transmitted from multiple points at a time. More particularly, data is simultaneously transmitted from multiple transmission points to a single UE.

Multi-Point PUCCH Attachment

The aforementioned CoMP transmissions specify channel state information feedback from the UE. In a conventional CoMP network, the UE transmits the channel state information to the serving eNodeB and the serving eNodeB transmits the channel state information to an interfering eNodeB via a backhaul, such as an X2 interface.

Figure 9:
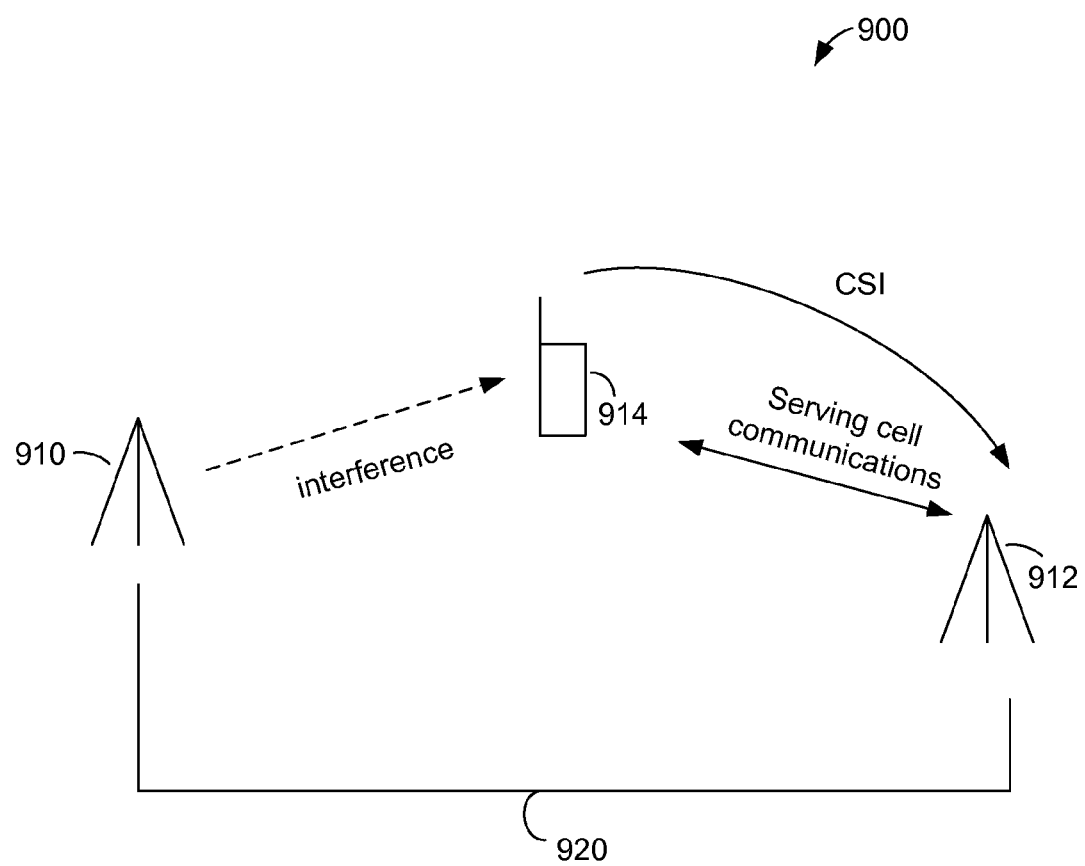
FIG. 9 is a block diagram illustrating a conventional network in which channel state information can be transmitted to a serving cell.

FIG. 9 illustrates a conventional CoMP network 900. As shown in FIG. 9, the network 900 includes a macro cell 910, a pico cell 912, and a UE 914. As an example, the UE 914 is served by the pico cell 912 (e.g., the serving cell) and signals from the macro cell 910 (e.g., the aggressor cell) may be treated as interference.

The UE may periodically report channel state information via a control channel, such as PUCCH, to the pico cell 912 (e.g., serving cell). In a CoMP network, the UE 914 may be requested to report channel state information (CSI) for other cells, such as the macro cell 910. The channel state information is typically only transmitted from the UE to the serving cell. Accordingly, the pico cell 912 receives the transmission on the control channel from the UE 914 and may extract the channel state information from the received control channel. The pico cell 912 may transmit the extracted channel state information to the macro cell 910 via a backhaul 920 (e.g., X2). In the present disclosure, the term cell may also refer to an eNodeB.

It is desired to provide a channel state information reporting scheme that reduces latency due to the backhaul exchange of the channel state information. Aspects of the present disclosure are for a periodic over-the-air channel state information reporting to serving cells and one or more non-serving cells via a control channel multi-point attachment.

According to an aspect of the present disclosure, a UE may directly transmit channel state information via a control channel to a serving cell and non-serving cells. That is, the UE may periodically transmit the channel state information to both a serving cell and a non-serving cells via a control channel.

According to an aspect, two sets of CSI/PMI reporting parameters may be provided. One set of CSI/PMI parameters may be for the serving cell and the second set of CSI/PMI parameters may be for the aggressor cell. In some cases, tie-breaking rules may be used to mitigate potential collisions between the two sets.

Figure 10:
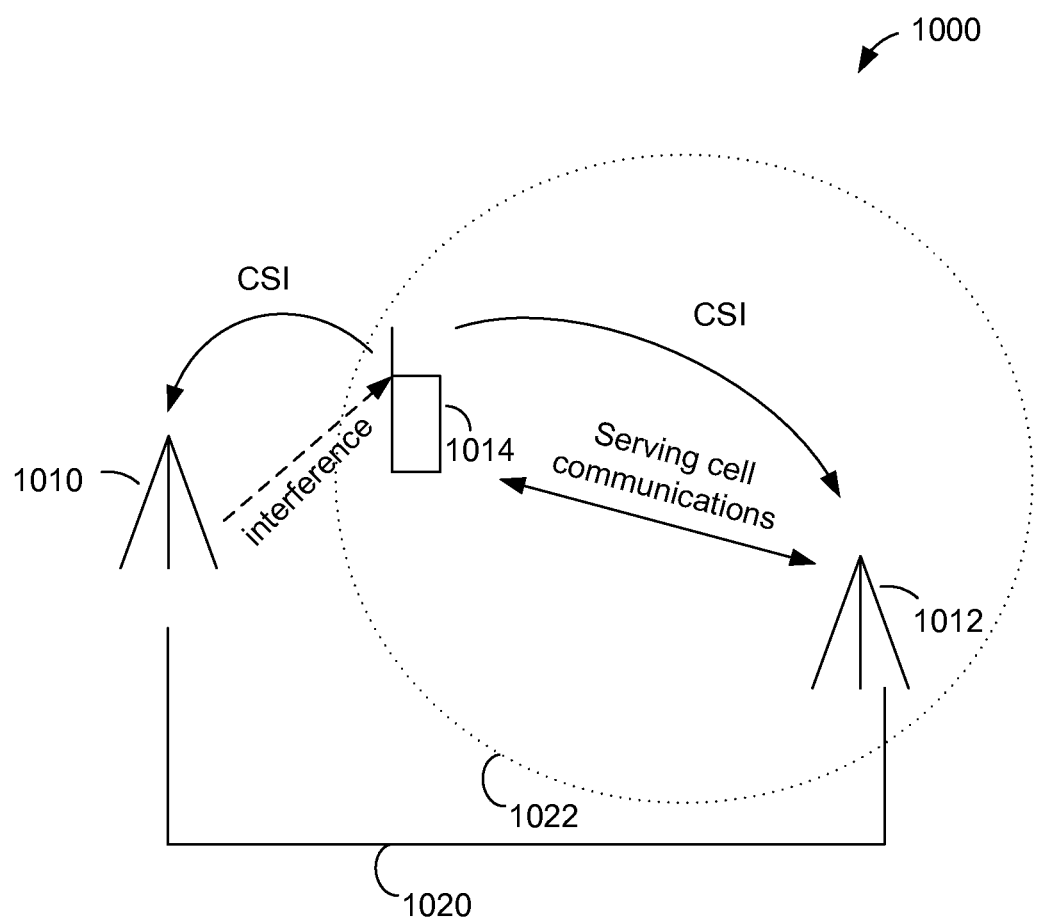
FIG. 10 is a block diagram illustrating a network in which channel state information can be transmitted to a serving cell and also a non-serving cell, according to an aspect of the present disclosure.

FIG. 10 illustrates a CoMP network 1000 according to an aspect of the present disclosure. As shown in FIG. 10, the network 1000 includes a macro cell 1010, a pico cell 1012, and a UE 1014. The macro cell 1010 and pico cell 1012 may communicate via a backhaul 1020. As an example, the UE 1014 is in the coverage area 1022 of the pico cell 1012 (e.g., the serving cell) and is served by the pico cell 1012. Furthermore, the UE may identify the macro cell 1010 (e.g., the aggressor cell) as a cell that is interfering with downlink signals from the pico cell 1012. According to an aspect, after identifying the macro cell 1010 as an aggressor, the UE may periodically report channel state information via a control channel, such as PUCCH, to both the pico cell 1012 and the macro cell 1010.

According to another aspect, a serving cell does not schedule transmissions on a shared channel for a specific UE when the specific UE is scheduled to transmit a channel state information report on a control channel to an aggressor cell. That is, an uplink scheduler in the serving cell may be aware of the channel state information report for the aggressor cell. In some aspects, the serving cell may only limit the shared channel transmissions for the specific UE that is transmitting the channel state information report, other UEs may still transmit on the shared channel while the specific UE is transmitting the channel state information report on the control channel.

In some cases, a transmission may not be scheduled in the subframes before or after a channel state information report is expected, depending on the timing difference between the scheduled transmissions. Specifically, if the channel state information report transmission on the control channel to the aggressor cell overlaps with more than one subframe of the serving cell, the serving cell may refrain from scheduling the shared channel, such as PUSCH, on the overlapped subframes.

For example, if the shared channel transmission is scheduled for subframes 1 to 3, the shared channel transmission may be delayed if the channel state information report for the aggressor cell is scheduled for either subframes 1, 2, or 3. In another aspect, a tie breaking rule may assign mutually exclusive resources (e.g., subframes) for the different channel state information reports (i.e., aggressor reports and serving cell reports). That is, the periodicity may differ and/or the actual assigned resources may differ for each channel state information report.

According to an aspect, the aggressor cell does not maintain a full UE context for non-served UEs. That is, the aggressor cell may use a reduced state UE context. The UE context refers to variables associated with the UE that are specified, most commonly, for the serving cell. Accordingly, the aggressor cell may only use specific, more limited information from the UE to obtain the channel state information. The specific information may include the type of reports, the UE identity, and the transmission subframes/resource blocks for the control channel. Furthermore, to facilitate decoding by the aggressor cell, the UE may use the cell ID of the aggressor cell when preparing the channel state information report.

According to one aspect, two or more timing advances and control channel power control loops may be used to compensate for the delays and/or path loss between the UE and serving cell, and between the UE and each aggressor cell. That is, the serving cell may control the uplink timing and uplink power for the associated UE so that the UE may use different timing references when reporting the channel state information to the serving cell and the aggressor cell.

For example, the difference in the propagation delays for the serving cell and aggressor cell may be large, and thus, different timing advance and power control commands may be specified to the UE from the aggressor cell and the serving cell. The timing advances and/or power control loops may be used to synchronize a time and/or frequency between the serving cell and an aggressor cell. In some cases, the aggressor cell may calculate the propagation delay and/or path loss from the UE and provides timing advance and/or power control commands to the serving cell via the backhaul (e.g., X2). The serving cell may transmit the received commands to the UE. According to an aspect, the received commands may be transmitted to the UE via a radio resource control (RRC) information element.

The UE may use different configurations for the payload type of the control channel. According to one aspect, the control channel includes the same payload, so that the content of the control channel is the same regardless of the cell that is receiving the payload. That is, the UE transmits the same channel state information report to both cells (e.g., aggressor and serving) on the control channel. According to an aspect, the control channel includes the channel state information for both cells if the channel state information is based on a multiple hypothesis channel state information or other channel state information schemes tailored for CoMP.

According to yet another aspect, the control channel may include different payloads depending on the destination cell. For example, each cell may be informed about the channel state information intended for the specific cell. This aspect may be used for CoMP channel state information schemes that use independent estimations and reports for the channel state information (e.g., multiple Release 8 feedbacks).

According to still yet another aspect, aperiodic channel state information reports may be transmitted via a shared channel. The aperiodic reporting may be triggered by the aggressor cell. That is, the aggressor cell may request an aperiodic channel state information report from a UE by transmitting a request to a serving cell via the backhaul. The serving cell may then transmit a request via a downlink control channel, such as PDCCH, to the UE. The channel state information request may include a flag for instructing the UE to report the channel state information to the non-serving cell (e.g., aggressor cell). In some cases, multi-carrier signaling schemes may be re-used for requesting aperiodic channel state information reports for multiple cells.

According to another aspect, channel state information may be reported to multiple cells in TDD if the downlink/uplink subframe partitioning is fulfilled. That is, if the serving cell and aggressor cell have different uplink/downlink partitioning, the channel state information may be transmitted on an uplink subframe common to both partitions. If both the serving cell and aggressor cell have approximately the same payload and propagation delay from the UE, both cells may decode the same report. That is, the different channel state information reports may not be specified for each cell. In the present aspect, the interfering cell may decode the control channel or shared channel using the physical cell ID (PCI) of the serving cell.

As discussed above, the serving cell and aggressor cell may exchange messages via a backhaul message exchange, such as the X2 interface. The backhaul messages may include information such as, periodic channel state information reporting parameters, control channel resources, timing advance and power control information and/or power control commands, and/or a UE state (e.g., UE transitioning to idle, handover, etc.).

According to another embodiment, the UE only reports the channel state information to a serving cell and the aggressor cell may intercept the channel state information reports. Specifically, the aggressor cell is informed via backhaul communication of the periodic channel state information reporting parameters, such as the subframes and/or resource blocks of the control channel, and also the cell ID of the serving cell. The aggressor cell may use CoMP type channel state information analysis to exclude the channel state information associated with the serving cell so that the aggressor cell may obtain the channel state information intended for the aggressor cell.

According to the another aspect, the aggressor cell may use an improved control channel decoding algorithm because the control channel may not be aligned with the aggressor cell's timing and the UE does not improve the transmission to the aggressor cell. For example, the UE may not use different power control schemes or different timing advances because the UE is unaware of the aggressor cell's interception of the channel state information.

According to yet another aspect, the aggressor cell may avoid scheduling shared channel transmissions of UEs associated with the aggressor cell to reduce a potential uplink interference and improve the potential for intercepting the message by reducing potential uplink interference. Moreover, the serving cell may avoid scheduling transmission on a shared channel when a periodic channel state information report is expected. In this aspect, a single timing advance and power control loop may be used.

Figure 11:
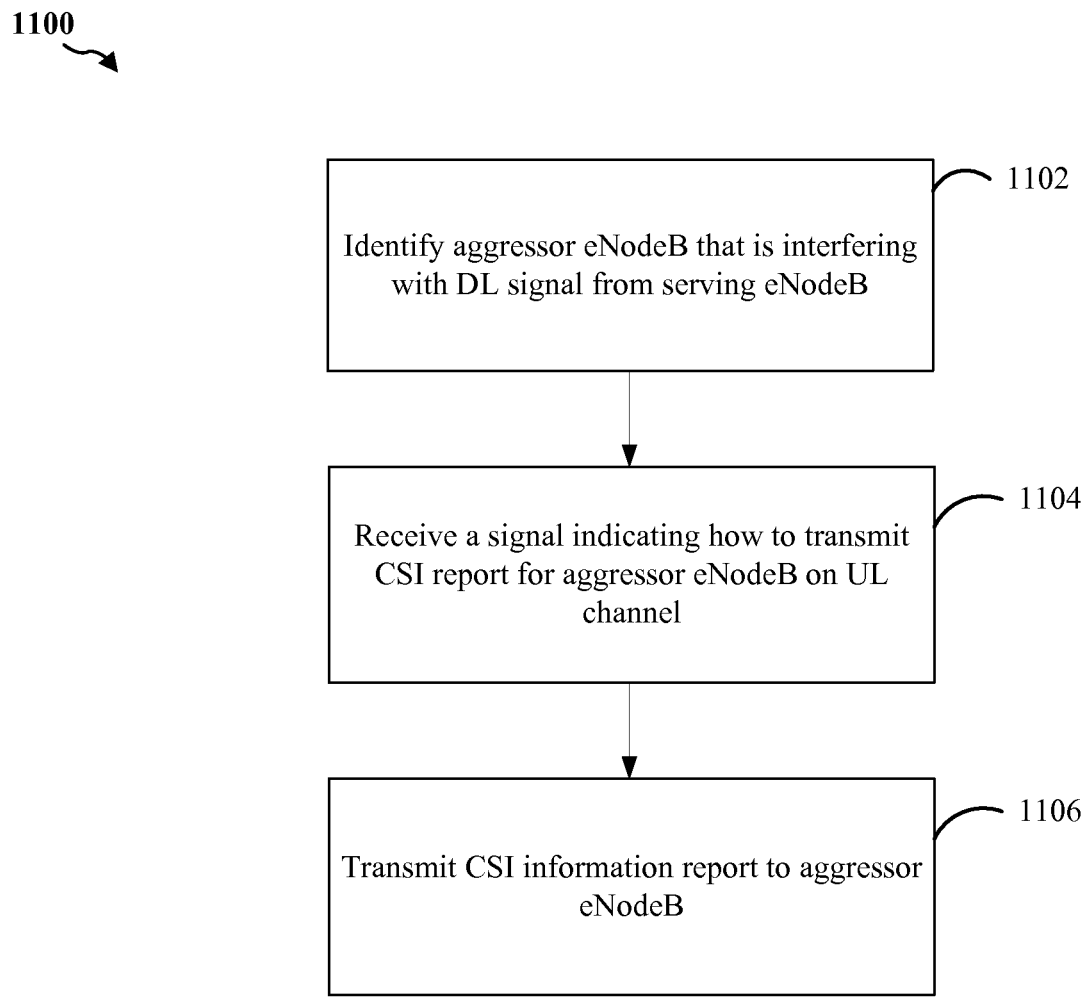
FIG. 11 is a block diagram illustrating a method for a multi-point PUCCH attachment.

FIG. 11 illustrates a method 1100 for wireless communication. In block 1102, a UE identifies an aggressor eNodeB that is interfering with a downlink signal from a serving eNodeB. The aggressor eNodeB may be a pico cell and may be detected as an aggressor when the UE is connected to a macro cell. The interference may be inter-RAT or intra-RAT interference.

In block 1104, according to an aspect, the UE receives a signal indicating how to transmit a channel state information report for the aggressor eNodeB on an uplink channel, in which the signal is provided by the serving eNodeB. In some aspects, the signal indicating how to transmit includes a periodicity, offset parameters, timing advance commands, power control commands, and/or an aperiodic report request. Furthermore, in some aspects, the signal is received from the aggressor eNodeB via the serving eNodeB.

Finally, the UE transmits the channel state information report to the aggressor eNodeB, in block 1106. According to an aspect, the channel state information report may be periodically transmitted via a control channel. Furthermore, in some aspects, the channels state information report may only include information for the aggressor eNodeB. Alternatively, the channel state information report may include information for both the aggressor eNodeB and the serving eNodeB.

In one configuration, the UE 650 is configured for wireless communication including means for identifying, means for receiving, and a means for transmitting. In one aspect, the identifying means, receiving means, and/or transmitting means may be the controller/processor 659 and memory 660; receive processor 656, TX processor 668, modulators 654, antenna 652 configured to perform the functions recited by the identifying means, receiving means, and/or transmitting means. In another aspect, the aforementioned means may be any module or any apparatus configured to perform the functions recited by the aforementioned means.

Figure 12:
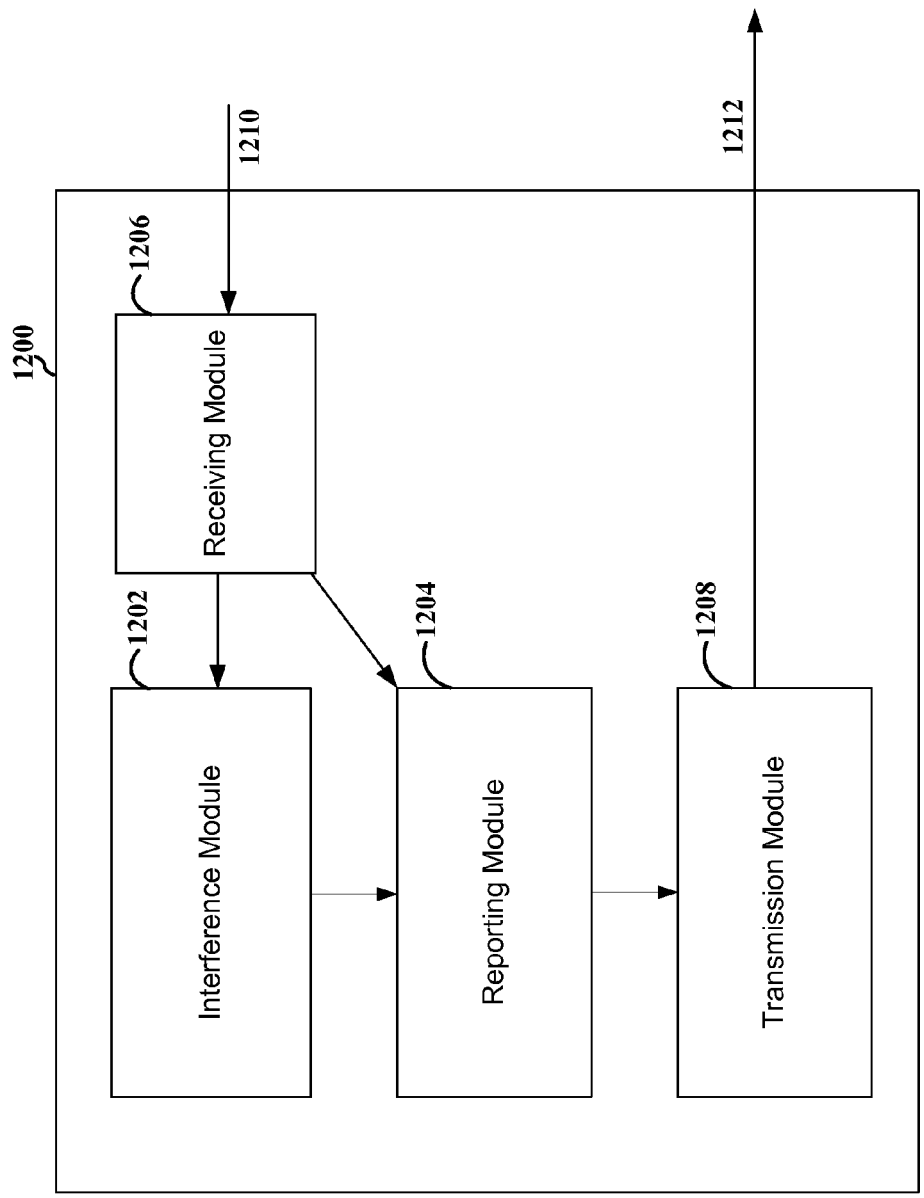
FIG. 12 is a conceptual data flow diagram illustrating the data flow between different modules/means/components in an exemplary apparatus.

FIG. 12 is a conceptual data flow diagram illustrating the data flow between different modules/means/components in an exemplary apparatus 1200. The apparatus 1200 includes an interference module 1202 that identifies an aggressor eNodeB that is interfering with a downlink signal from a serving eNodeB. The interference module 1202 may determine identify the aggressor eNodeB via interference detected from signals 1210 received at the receiving module 1206. The apparatus 1200 further includes a reporting module 1204 that receives a signal indicating how to transmit a channel state information report for the aggressor eNodeB on an uplink channel. The reporting module may receive the signal from a serving eNodeB. The signal transmitted from the serving eNodeB may be received at the receiving module and transmitted to the reporting module. The interference module 1202 may report the detected interference to the reporting module. The reporting module 1204 may further control the transmission module 1208 to transmit the channel state information report to the aggressor eNodeB. The transmission may be sent via a signal 1212 transmitted form the transmission module 1208. The apparatus may include additional modules that perform each of the steps of the algorithm in the aforementioned flow charts FIG. 11. As such, each step in the aforementioned flow charts FIG. 11 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 13:
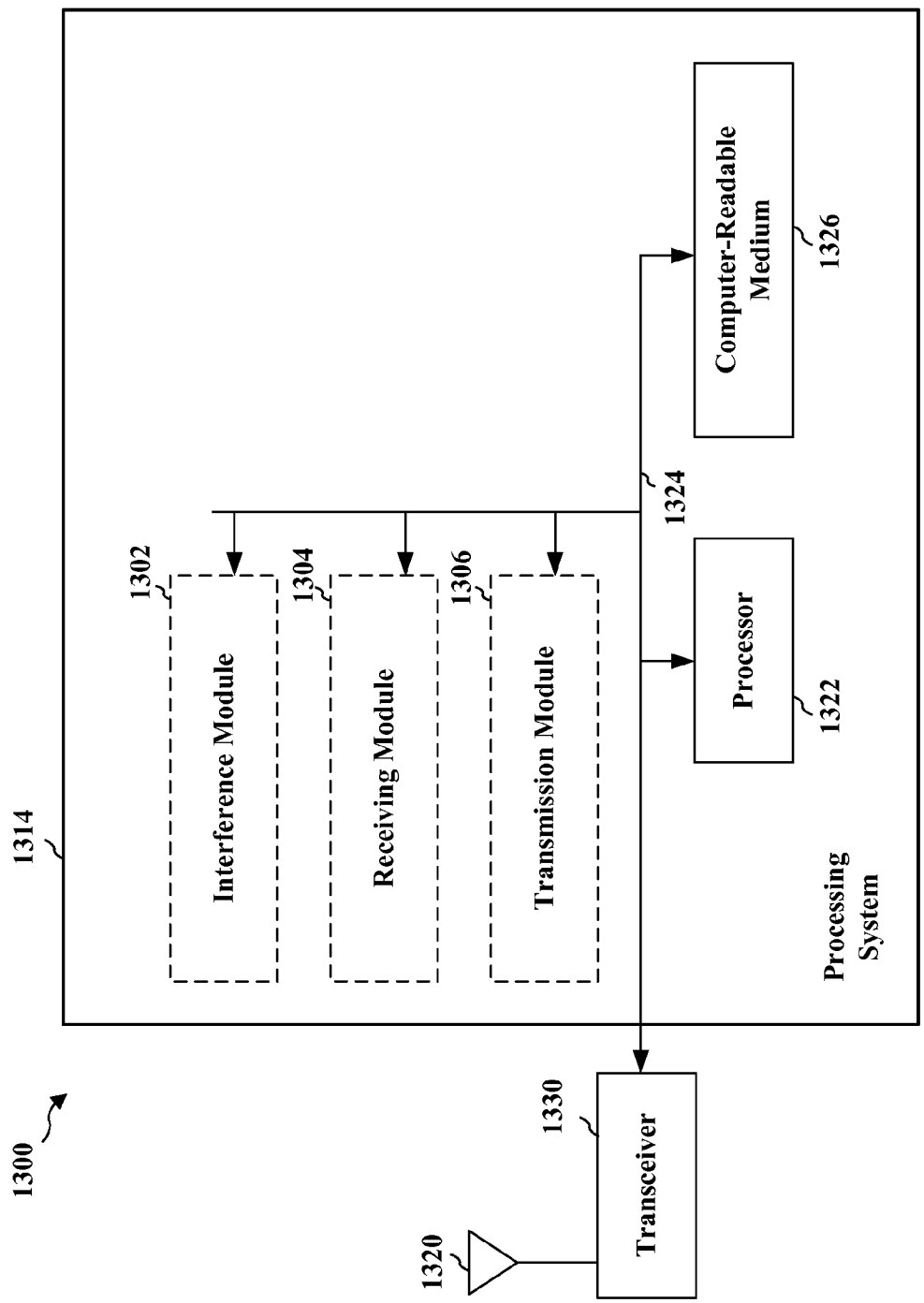
FIG. 13 is a block diagram illustrating different modules/means/components in an exemplary apparatus.

FIG. 13 is a diagram illustrating an example of a hardware implementation for an apparatus 1300 employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware modules, represented by the processor 1322 the modules 1302, 1304, 1306, and the computer-readable medium 1326. The bus 1324 may also link various other circuits such as timing sources, peripherals, voltage regulators, and power management circuits, which are well known in the art, and therefore, will not be described any further.

The apparatus includes a processing system 1314 coupled to a transceiver 1330. The transceiver 1330 is coupled to one or more antennas 1320. The transceiver 1330 enables communicating with various other apparatus over a transmission medium. The processing system 1314 includes a processor 1322 coupled to a computer-readable medium 1326. The processor 1322 is responsible for general processing, including the execution of software stored on the computer-readable medium 1326. The software, when executed by the processor 1322, causes the processing system 1314 to perform the various functions described for any particular apparatus. The computer-readable medium 1326 may also be used for storing data that is manipulated by the processor 1322 when executing software.

The processing system 1314 includes an interference module 1302 for identifying an aggressor eNodeB that is interfering with a downlink signal from a serving eNodeB. The processing system 1314 includes a receiving module 1304 for receiving a signal indicating how to transmit the CSI report for the aggressor eNodeB on an uplink channel, in which the signal is provided by the serving eNodeB. The processing system 1314 further includes a transmission module 1306 for transmitting a channel state information (CSI) report to the aggressor eNodeB. The modules may be software modules running in the processor 1322, resident/stored in the computer-readable medium 1326, one or more hardware modules coupled to the processor 1322, or some combination thereof. The processing system 1314 may be a component of the UE 650 and may include the memory 660, and/or the controller/processor 659.

Figure 14:
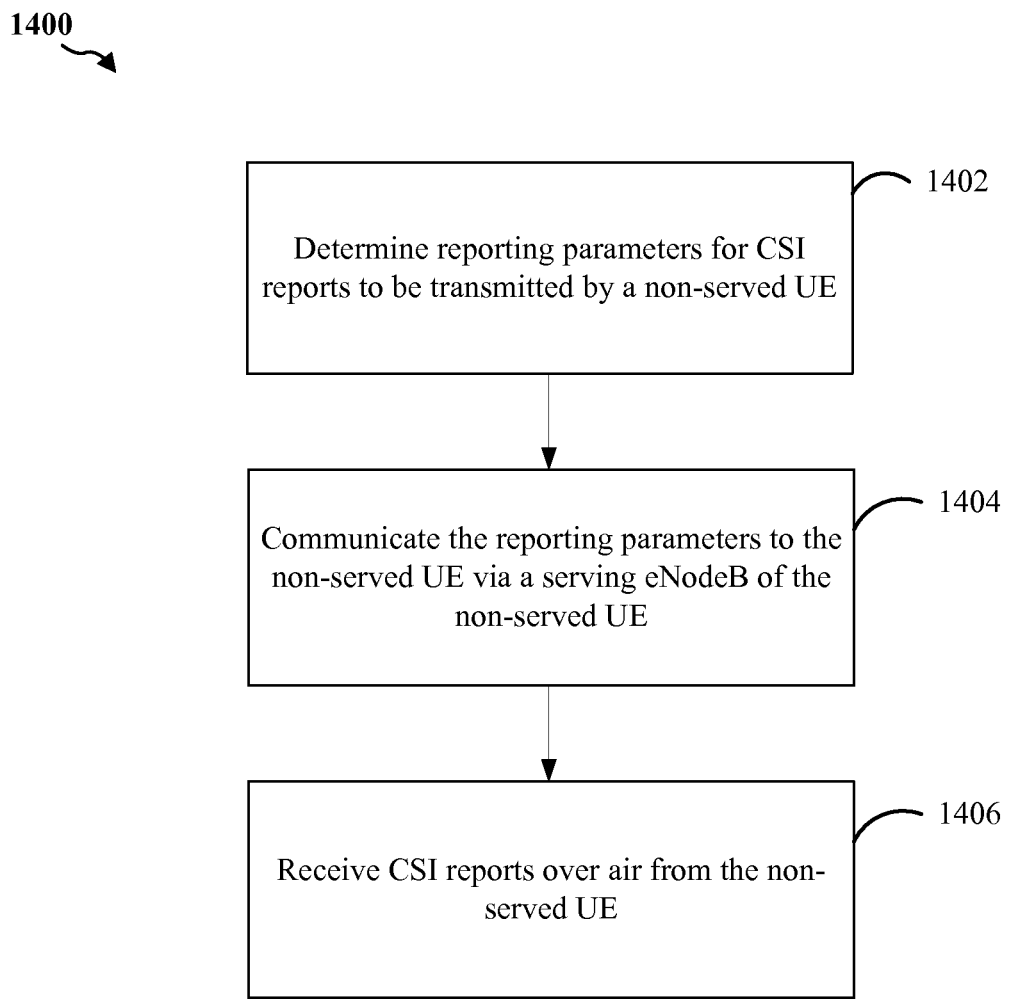
FIG. 14 is a block diagram illustrating a method for a multi-point PUCCH attachment.

FIG. 14 illustrates a method 1400 for wireless communication. In block 1402, an eNodeB determines reporting parameters for CSI reports to be transmitted by a non-served UE. In some aspects, the parameters include a periodicity, offset parameters, timing advance commands, power control commands, and/or an aperiodic report request.

In block 1404, according to an aspect, the eNodeB communicates the reporting parameters to the non-served UE via a serving eNodeB of the non-served UE. The eNodeB may transmit the information, such as the power control commands, timing advance commands, and/or aperiodic report requests to the serving eNodeB via a backhaul, such as an X2 interface.

Finally, the eNodeB receives CSI reports over air from the non-served UE, in block 1406. According to an aspect, the channel state information report may be periodically transmitted via a control channel. Furthermore, in some aspects, the channels state information report may only include information for the aggressor eNodeB. Alternatively, the channel state information report may include information for both the aggressor eNodeB and the serving eNodeB.

In one configuration, the eNodeB 610 is configured for wireless communication including means for determining, means for communicating, and means for receiving. In one aspect, the determining means, communicating means, and/or receiving means may be the controller/processor 675, transmit processor 616, RX processor 670, antenna 620, modulators 618, and memory 676 configured to perform the functions recited by the determining means, communicating means, and/or receiving means. In another aspect, the aforementioned means may be any module or any apparatus configured to perform the functions recited by the aforementioned means.

Figure 15:
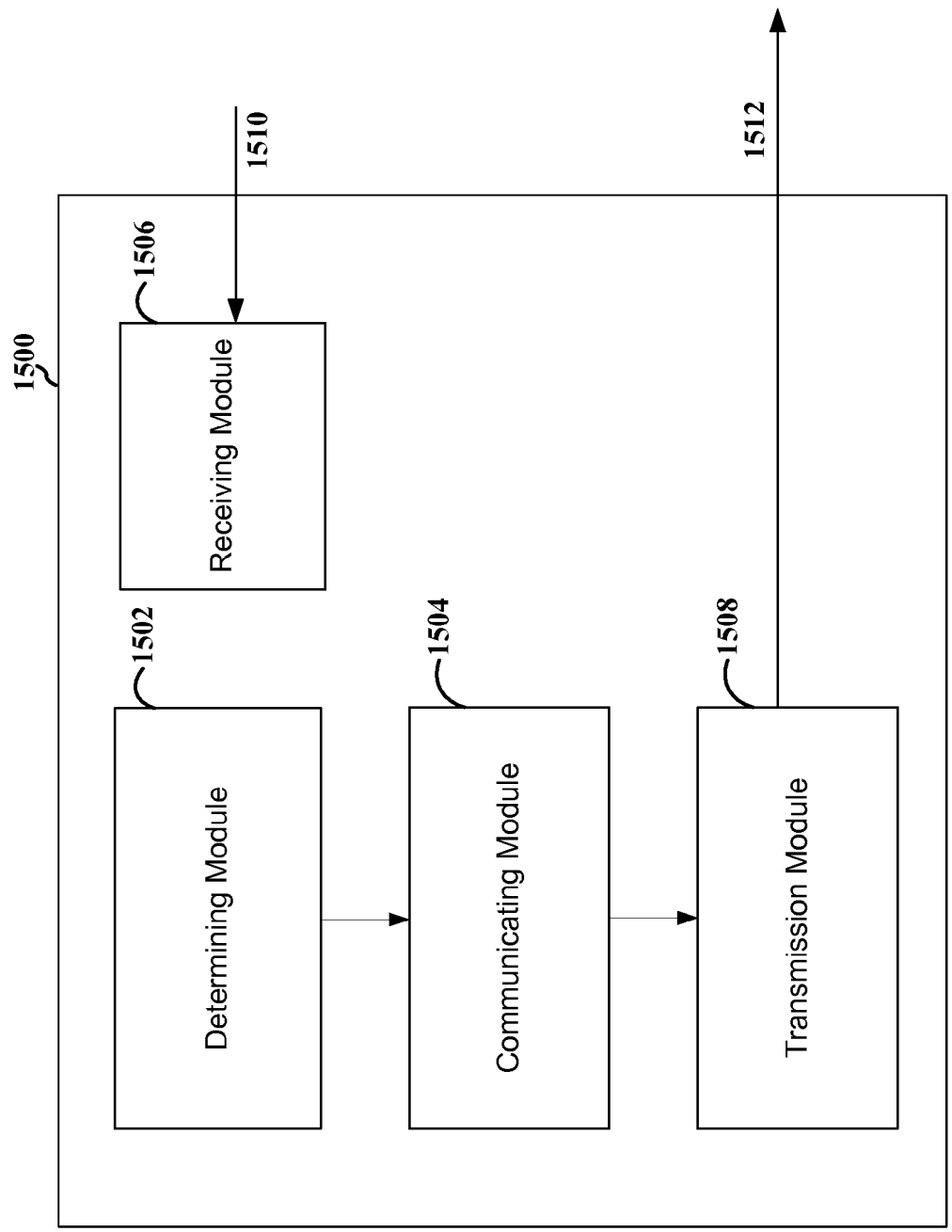
FIG. 15 is a conceptual data flow diagram illustrating the data flow between different modules/means/components in an exemplary apparatus.

FIG. 15 is a conceptual data flow diagram illustrating the data flow between different modules/means/components in an exemplary apparatus 1500. The apparatus 1500 includes a determining module 1502 that determines reporting parameters for CSI reports to be transmitted by a non-served UE. The apparatus 1500 also includes a communicating module 1504 that communicates the reporting parameters to the non-served UE via a serving eNodeB of the non-served UE. The communicating module transmits the reporting parameters via a transmission module 1508. The transmission module 1508 may transmit the reporting parameters via a signal 1512 that is sent on a backhaul. The apparatus 1500 may further include a receiving module 1506 that receives a CSI report from a signal 1510 transmitted by the non-served UE. The apparatus may include additional modules that perform each of the steps of the algorithm in the aforementioned flow charts FIG. 14. As such, each step in the aforementioned flow charts FIG. 14 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 16:
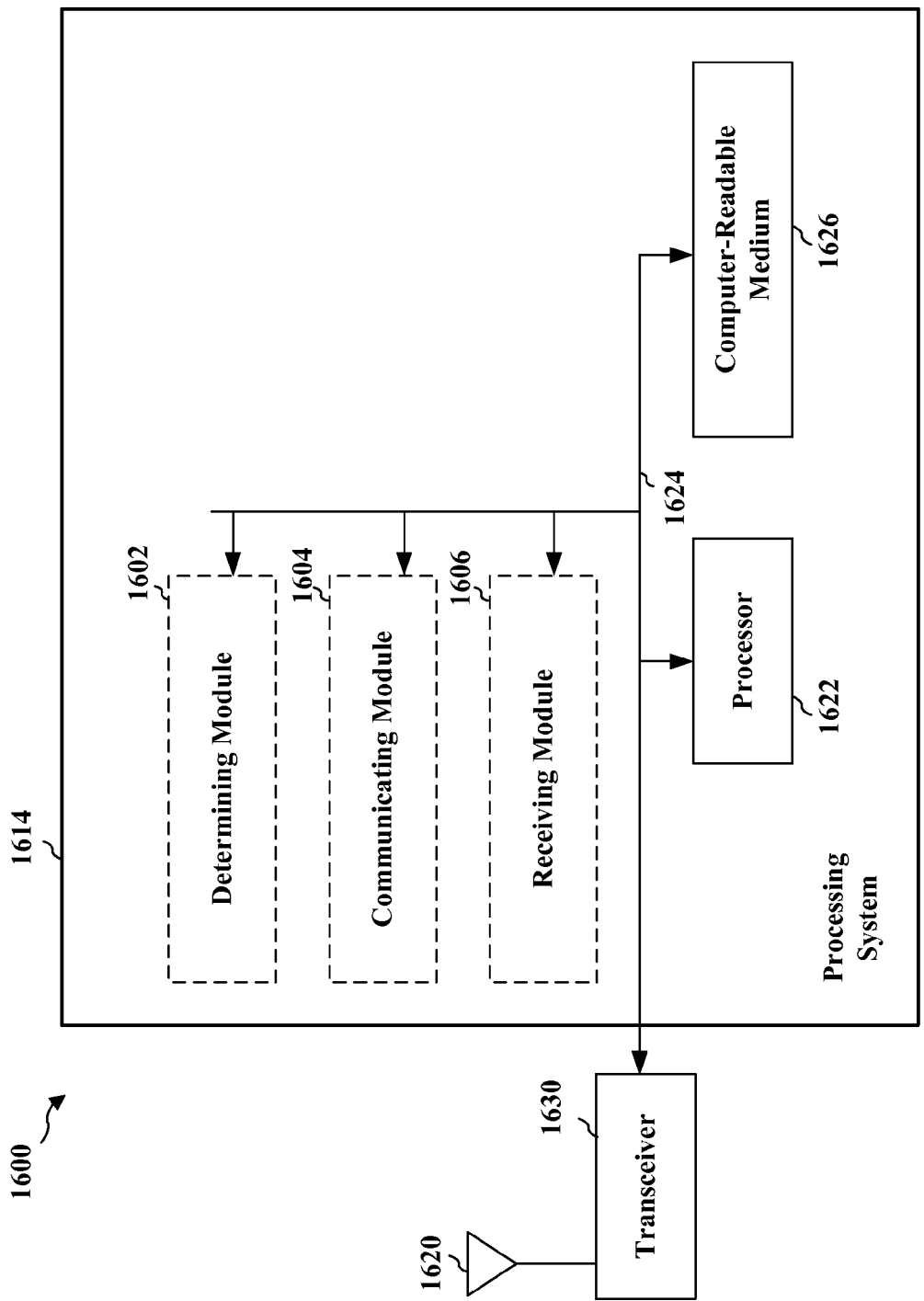
FIG. 16 is a block diagram illustrating different modules/means/components in an exemplary apparatus.

FIG. 16 is a diagram illustrating an example of a hardware implementation for an apparatus 1600 employing a processing system 1614. The processing system 1614 may be implemented with a bus architecture, represented generally by the bus 1624. The bus 1624 may include any number of interconnecting buses and bridges depending on the specific application of the processing system 1614 and the overall design constraints. The bus 1624 links together various circuits including one or more processors and/or hardware modules, represented by the processor 1622 the modules 1602, 1604, 1606 and the computer-readable medium 1626. The bus 1624 may also link various other circuits such as timing sources, peripherals, voltage regulators, and power management circuits, which are well known in the art, and therefore, will not be described any further.

The apparatus includes a processing system 1614 coupled to a transceiver 1630. The transceiver 1630 is coupled to one or more antennas 1620. The transceiver 1630 enables communicating with various other apparatus over a transmission medium. The processing system 1614 includes a processor 1622 coupled to a computer-readable medium 1626. The processor 1622 is responsible for general processing, including the execution of software stored on the computer-readable medium 1626. The software, when executed by the processor 1622, causes the processing system 1614 to perform the various functions described for any particular apparatus. The computer-readable medium 1626 may also be used for storing data that is manipulated by the processor 1622 when executing software.

The processing system 1614 includes a determining module 1602 for determining reporting parameters for CSI reports to be transmitted by a non-served user equipment. The processing system 1614 also includes a communicating module 1604 for communicating the reporting parameters to the non-served UE via a serving eNodeB of the non-served UE. The processing system 1614 may further include a receiving module 1606 for receiving CSI reports over air from the non-served UE. The modules may be software modules running in the processor 1622, resident/stored in the computer-readable medium 1626, one or more hardware modules coupled to the processor 1622, or some combination thereof. The processing system 614 may be a component of the UE 650 and may include the memory 660, and/or the controller/processor 659.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, the method comprising:
    identifying, by a user equipment (UE), a first base station that is interfering with a downlink signal from a second base station;
    receiving, by the UE from the second base station, a signal indicating first parameters of the first base station for transmitting a first channel state information (CSI) report to the first base station and second parameters of the second base station for transmitting a second CSI report to the second base station, wherein the first parameters of the first base station are different from the second parameters of the second base station;
    transmitting, by the UE, the first CSI report to the first base station based at least in part on the first parameters of the first base station; and
    transmitting, by the UE, the second CSI report to the second base station based at least in part on the second parameters of the second base station.

2. The method of claim 1, wherein the first parameters of the first base station comprise at least one of a periodicity report request, an aperiodic report request, offset parameters, timing advance commands, or power control commands.

3. The method of claim 1, wherein the first parameters of the first base station are provided to the second base station via a backhaul.

4. The method of claim 1, wherein the first CSI report comprises information associated with the first base station.

5. The method of claim 1, wherein the first CSI report is transmitted when the first base station and the second base station have a different payload and propagation delay from the UE.

6. The method of claim 1, wherein the second CSI report comprises first information associated with the first base station and second information associated with the second base station when the first base station and the second base station have a same payload and propagation delay from the UE.

7. The method of claim 1, wherein the first CSI report is transmitted periodically on a physical uplink control channel (PUCCH).

8. The method of claim 1, wherein the first CSI report is transmitted aperiodically on a physical uplink shared channel (PUSCH) in response to a signal triggered by the first base station and received over air from the second base station.

9. A method of wireless communication, the method comprising:
   determining, at a first base station, first reporting parameters for transmitting a first channel state information (CSI) report from a user equipment (UE) to the first base station, wherein the first reporting parameters are different from second reporting parameters that are used for transmitting a second CSI report to a second base station that serves the UE, the first reporting parameters of the first base station provided to the second base station via a backhaul link for transmission to the UE via the second base station; and
   receiving, at the first base station, the first CSI report over air from the UE that is not served by the first base station, based at least in part on the first reporting parameters.

10. The method of claim 9, wherein the first reporting parameters comprising at least one of a periodicity, an aperiodic report request, offset parameters, timing advance commands, power control commands, or a combination thereof.

11. The method of claim 9, wherein the second CSI report is received by the second base station when the first base station and the second base station have a same payload and propagation delay from the UE.

12. The method of claim 9, wherein the first CSI report is not received by the second base station.

13. The method of claim 9, further comprising intercepting the second CSI report intended for the second base station.

14. The method of claim 9, further comprising communicating the first reporting parameters to the UE via the second base station.

15. An apparatus for wireless communications, comprising:
   means for identifying, at a processor of a user equipment (UE), a first base station that is interfering with a downlink signal from a second base station;
   means for receiving, at the UE from the second base station, a signal indicating first parameters for transmitting a first channel state information (CSI) report to the first base station and second parameters for transmitting a second CSI report to the second base station, wherein the first parameters of the first base station are different from the second parameters of the second base station;
   means for transmitting, by the UE, the first CSI report to the first base station based at least in part on the first parameters of the first base station; and
   means for transmitting, by the UE, the second CSI report to the second base station based at least in part on the second parameters of the second base station.

16. An apparatus for wireless communications, comprising:
   means for determining, at a processor of a first base station, first reporting parameters for transmitting a first channel state information (CSI) report from a user equipment (UE) to the first base station, wherein the first reporting parameters are different from second reporting parameters that are used for transmitting a second CSI report to a second base station that serves the UE, the first reporting parameters of the first base station provided to the second base station via a backhaul link for transmission to the UE via the second base station; and
   means for receiving, at the first base station, the first CSI report over air from the UE that is not served by the first base station, based at least in part on the first reporting parameters.

17. A non-transitory computer-readable medium having program code recorded thereon for wireless communications, the program code comprising:
   program code to identify, at a user equipment (UE), a first base station that is interfering with a downlink signal from a second base station;
   program code to receive, at the UE from the second base station, a signal indicating first parameters for transmitting a first channel state information (CSI) report to the first base station and second parameters for transmitting a second CSI report to the second base station, wherein the first reporting parameters are different from second reporting parameters that are used for transmitting the second CSI report to the second base station that serves the UE;
   program code to transmit, at the UE, the first CSI report to the first base station based at least in part on the first parameters of the first base station; and
   program code to transmit, at the UE, the second CSI report to the second base station based at least in part on the second parameters of the second base station.

18. A non-transitory computer-readable medium having program code recorded thereon for wireless communications, the program code comprising:
   program code to determine, at a first base station, first reporting parameters for transmitting a first channel state information (CSI) report from a user equipment (UE) to the first base station, wherein the first reporting parameters are different from second reporting parameters that are used for transmitting a second CSI report to a second base station that serves the UE, the first reporting parameters of the first base station provided to the second base station via a backhaul link for transmission to the UE via the second base station; and
   program code to receive, at the first base station, the first CSI report over air from the UE that is not served by the first base station, based at least in part on the first reporting parameters.

19. A user equipment (UE) for wireless communications, the UE comprising:
a memory; and
at least one processor coupled to the memory, the at least one processor being configured:
to identify a first base station that is interfering with a downlink signal from a second base station;
to receive, from the second base station, a signal indicating first parameters for transmitting a first channel state information (CSI) report to the first base station and second parameters for transmitting a second CSI report to the second base station, wherein the first parameters of the first base station are different from the second parameters of the second base station;
to transmit the first CSI report to the first base station based at least in part on the first parameters of the first base station; and
to transmit the second CSI report to the second base station based at least in part on the second parameters of the second base station.

20. The UE of claim 19, wherein the second CSI report comprises information associated with the first base station and information associated with the second base station when the first base station and the second base station have a same payload and propagation delay from the UE.

21. The UE of claim 19, wherein the transmitting occurs periodically on a physical uplink control channel (PUCCH).

22. The UE of claim 19, wherein the at least one processor is further configured to aperiodically transmit the first CSI report on a physical uplink shared channel (PUSCH) triggered by the first base station and received over air from the second base station.

23. A first base station for wireless communications, the first base station comprising:
a memory; and
at least one processor coupled to the memory, the at least one processor being configured:
to determine first reporting parameters for transmitting a first channel state information (CSI) report from a user equipment (UE) to the first base station, wherein the first reporting parameters are different from second reporting parameters that are used for transmitting a second CSI report to a second base station that serves the UE, the first reporting parameters of the first base station provided to the second base station via a backhaul link for transmission to the UE via the second base station; and
to receive, at the first base station, the first CSI report over air from the UE that is not served by the first base station, based at least in part on the first reporting parameters.

24. The first base station of claim 23, wherein the second CSI report is received by the second base station when the first base station and the second base station have a same payload and propagation delay from the UE.

25. The first base station of claim 23, wherein the first CSI report is not received by the second base station.

26. The first base station of claim 23, wherein the at least one processor is further configured to intercept the second CSI report intended for the second base station.

27. The first base station of claim 23, wherein the at least one processor is further configured to communicate the first reporting parameters to the UE via the second base station.

* * * * *